United States Patent [19]

Roccabianca et al.

[11] Patent Number: 4,746,255
[45] Date of Patent: May 24, 1988

[54] MACHINE FOR AUTOMATICALLY LOADING PALLETS

[76] Inventors: Graziano Roccabianca, Via Roma 84, S.M. Camisano Vicentino (VI); Claudio Santacà, Via Lungochiampo, 34 Montebello Vicentino, both of Italy

[21] Appl. No.: 12,667
[22] PCT Filed: Jun. 19, 1986
[86] PCT No.: PCT/IT86/00044
    § 371 Date: Jan. 27, 1987
    § 102(e) Date: Jan. 27, 1987
[87] PCT Pub. No.: WO86/07579
    PCT Pub. Date: Dec. 31, 1986

[30] Foreign Application Priority Data

Jun. 19, 1985 [IT] Italy .................. 22218 B/85[U]

[51] Int. Cl.⁴ .............................................. B65G 57/06
[52] U.S. Cl. .................................. 414/84; 294/67.33; 414/71; 414/902
[58] Field of Search ............ 414/70, 71, 82, 84, 414/902, 76, 77; 294/67.33

[56] References Cited

U.S. PATENT DOCUMENTS

| | | | |
|---|---|---|---|
| 3,586,176 | 6/1971 | Rackman | 414/902 X |
| 3,884,363 | 5/1975 | Ajlouny | 414/902 X |
| 4,242,025 | 12/1980 | Thibault | 414/70 |
| 4,273,506 | 6/1981 | Thomson et al. | 414/735 |
| 4,383,788 | 5/1983 | Sylvander | 414/71 |
| 4,641,271 | 2/1987 | Konishi et al. | 414/902 X |

FOREIGN PATENT DOCUMENTS

| | | | |
|---|---|---|---|
| 2358349 | 2/1978 | France | 414/82 |
| 2454987 | 12/1980 | France | 414/71 |
| 2582629 | 12/1986 | France | 414/902 |
| 8300942 | 3/1983 | World Int. Prop. O. | 414/902 |

OTHER PUBLICATIONS

Robot Case Palletizer/Depalletizer brochure, Model 250, FMC Corporation, Hoopeston, Ill., copyright 1984.

Primary Examiner—Leslie J. Paperner
Attorney, Agent, or Firm—Michael J. Striker

[57] ABSTRACT

Machine (10) for automatic transfer of objects, especially packages (22), (62) of books, from a feed or production line (23) or station to load receiving structures generally, especially pallets (20) and for placing them in the best way on such structures, or vice versa. A grab (17), (64) assumes almost any position in space land is operated, via a direct electronic control device, by a computer. Data is typed into the computer which defines the sizes and position of both the objects (22), (62) and the loading structure (20) and the best, or preferred, positions of the objects (22), (62) and the structures (20).

2 Claims, 4 Drawing Sheets

4,746,255

MACHINE FOR AUTOMATICALLY LOADING PALLETS

BACKGROUND OF THE INVENTION

The present invention relates generally to a machine for transferring objects from a working station to a load receiving structure, such as a pallet.

Many automated machines are on the market for transferring various pieces and objects from production or feed lines to structures for collecting, using or storing them or vice versa.

The loading structures or platforms generally called pallets are also known. Personal computers are also known.

If operated by card-type or "quota by quota" self-learning processors, the above automated machines require long periods of preparation and adjustment to be carried out by experts using special equipment.

SUMMARY OF THE INVENTION

It is an object of the invention to automatically move objects, especially packaged books or other material, from an arrival point of a production line to receiving structures generally, especially onto pallets, or vice versa. It is another object to place such packages in the best or preferred position on said structures.

In keeping with these objects, the machine comprises a grab for picking up or putting down objects. The grab can take up any position in space in relation to the objects and to the loading structures.

All movements made by the grab are controlled by electric motors, by hydraulic cylinders fitted with solenoid valves or other devices operated by an electronic panel served by a computer.

This computer processes input data regarding the size and position of the objects, the loading structure, and the best or preferred positions for the objects in relation to said structure.

The grab moves, translating parallel to itself, in accordance with the Cartesian axes and can rotate around a vertical axis.

In other embodiments the grab moves by making anthropromorphic movements, in other words by movements similar to those made by human limbs.

The most suitable type of computer for the purpose is that known as the personal computer, into which the user types in the required data.

In another kind of execution, suitable sensors are placed in the trajectories made by the objects and loading structures or where they are positioned to provide the computer with details about the sizes and positions of the objects and the structures, from one moment to the next.

It is thus sufficient to type into the computer, at the moment when the grab must work, the data needed to state the best or preferred positions of the objects in relation to the structures, or vice versa.

The grab is fitted with horizontal blades which slide below the object to pick it up, and which slide in the opposite direction to release it.

A pressing device, hydraulically or electro-mechanically operated, is moved downward into contact with the upper surface of the object to stabilize it and can inform the computer of said object's height.

In one kind of execution the grab's horizontal blades lie in a horizontal slit, passing from one side to the other, in a supporting piece placed at the lower extremity of a vertical arm, which allows them to translate axially in both directions across the slit.

In one direction for picking up the object, the blades then move out on the front side of the arm towards the area destined for pick-up and return on the back side, in the opposite direction for releasing the object, the blades return on the front side and emerge on the back side.

Around these blades, lengthwise, there is a ring-shaped sheath of cloth, rubber, plastic and the like, whose ends are applied, above the slit, respectively on the front and back sides of the arm supporting the grab.

The lower part of said sheath is therefore disposed below the blades and below their support.

Therefore, when the blades return from the front side of the arm and project from the back side to allow the object to be put down, they slide along inside the sheath and consequently below that part of the sheath between the blade and the object.

Thus freed from the blades, the object is placed on the unloading surface without any friction between the object and the blades and sheath and therefore without any risk of its being scratched or damaged during unloading.

By means of a vertical arm, the grab is suspended from an undercarriage translating on a horizontal arm projecting from a lift trolley that slides on the vertical guides of a column. Said column is in turn fixed to a third trolley translating on the horizontal guides of a bed-plate.

In one embodiment the grab is sized and shaped to allow transfer of two or more objects if required, especially packages of books and the like, simultaneously.

In a preferred embodiment, a feed line of packages of books and the like and a place for situating pallets and the like are provided.

According to the data typed into the computer or received from sensors placed along the trajectory of the packages and at the pallet station, the computer, through the electronic control panel, controls the grad as required based on the sizes of the packages and of the pallets and as preferred by the operator.

As the packages arrive, the grab picks them up and puts them down on the pallets, arranging them in the best way. Alternately the grab lifts the packages off the pallets, placing them as needed for sorting, shipment and so on.

The characteristics and purposes of the invention will be made still clearer by the following examples of its execution illustrated by drawings.

DESCRIPTION OF THE PREFERRED EMBODIMENTS

Figure 1:
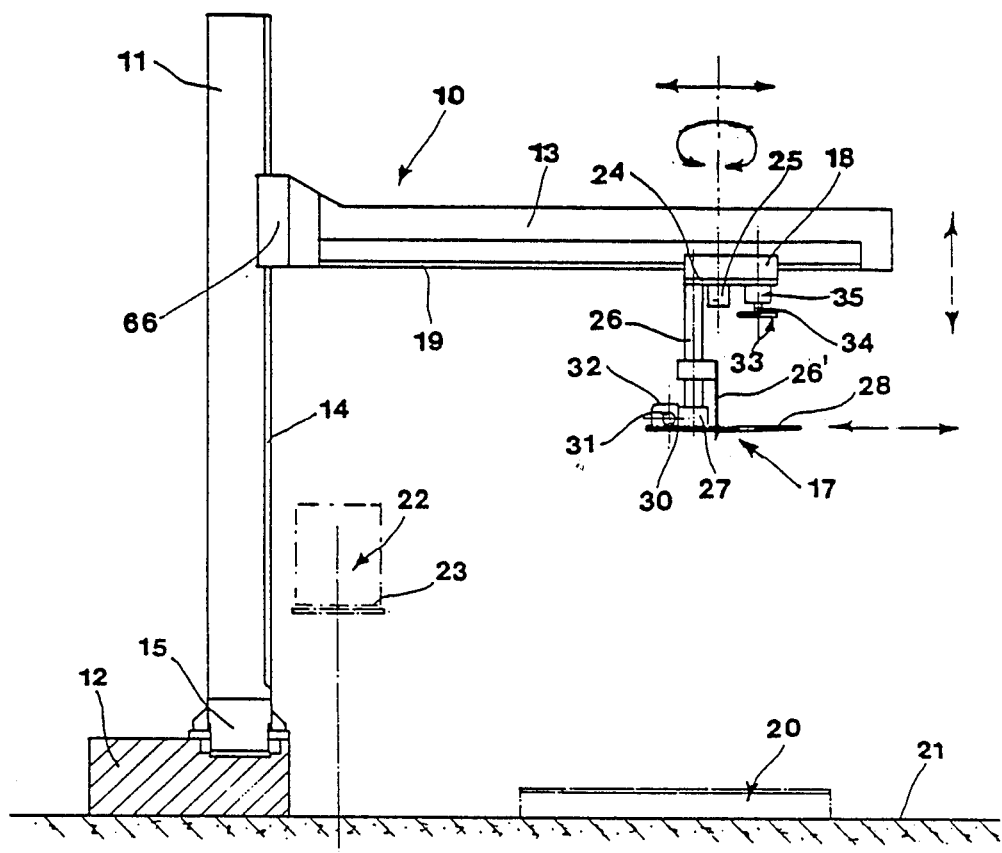
FIG. 1 is a side elevational view of the machine.

The machine (10) comprises an arm (13) which can translate vertically on the guides (14) of the column (11). Said column is fixed to the trolley (15) translatable along the guide (16) of the bed-plate (12).

The grab (17) is supported by an undercarriage (18) translatable longitudinally along guides (19) mounted on the arm (13), which project outward from a trolley (66).

With such varying possibilities of translation the grab can take up any position within the space of its field of action especially in relation both to the pallet (20) set on the pallet loading surface (21) and to the packages, such as (22), arriving on the feed surface (23).

The grab (17) comprises a plate (24) which, in relation to the trolley (18) can rotate around the axis of the bushing (25), and a vertical arm (26) which has a bracket (27) fixed at its end.

Said bracket in turn supports the blades (28) and (29) for picking up the packages (22), said blades having fixed to them a rack (30) which engages the pinion gear (31) of the electric motor (32) fixed to the bracket (27).

Therefore, by working the electric motor, in one direction or the other, the blades can be made to project as needed in relation to the vertical plate (26') fixed to the arm (26).

Figure 2:
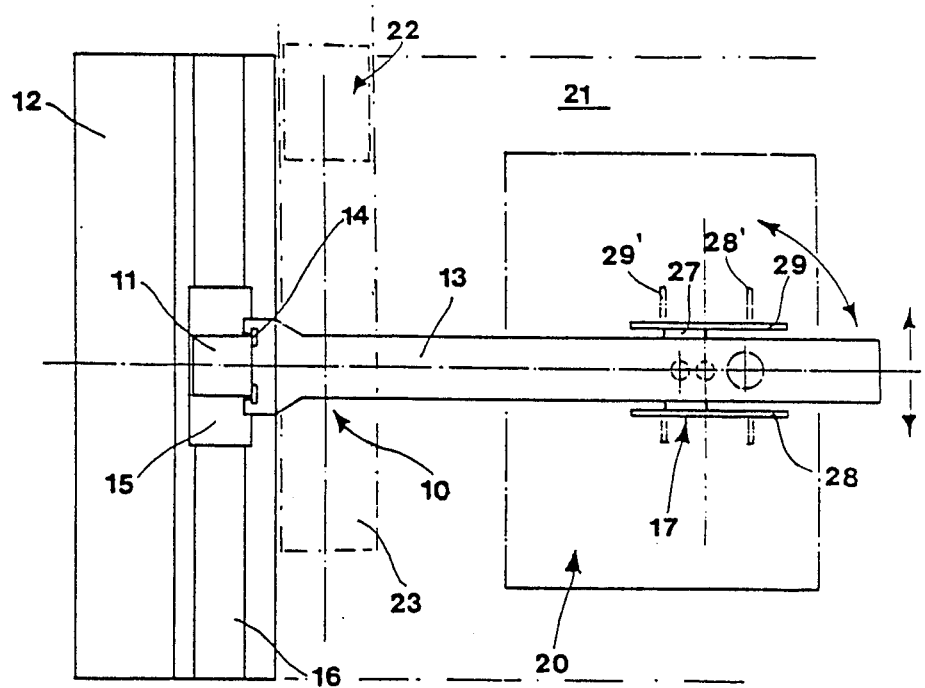
FIG. 2 is a top view thereof.

In FIG. 2, (28') and (29') indicate the positions of the blades when the grab has made a turn of 90°.

With the piston (34) sliding in the cylinder (35) by adequate fluidic means, the presser (33) can be brought down to the top of the package picked up by the blades (28) and (29).

All movements made by the machine, and especially horizontal translation of the column (11), vertical translation of the arm (13), horizontal translation of the grab (17) on the arm (13), translation of the blades (28) and (29), rotation of the grab (17) in relation to its undercarriage (18), movement of the presser (33),
are controlled by electric motors or by hydraulic or pneumatic cylinders served by solenoid valves, that is by electric organs connected to electronic circuits operated by a computer which, for simplicity, is not shown.

The computer, acting on instructions typed into it by the user, and in accordance with the sizes and position of the pallet and of the packages, picks said packages up on arrival and lays them on the pallet so as to occupy its space in the best, or preferred, manner.

For example, the packages are placed side by side in a longitudinal or transversal direction in relation to the pallet's surface until one layer is completed, continuing until more layers are added up to a suitable height.

The main data typed into the computer are: sizes of the pallet and of the package, number of packages per layer, number of layers, disposition of packages on the pallet for each layer, and so on.

Some or all of these data may be required by the computer. It is therefore sufficient for the user to type in what is needed on the keyboard.

What has been described as a package can of course be any kind of object, such as a part of a machine, while what has been described as a pallet can be any means for collecting or containing objects.

Similarly, the operations may be the reverse of those described, namely objects may be taken off a pallet or from any kind of bench, and such objects, or packages, be placed on a station for processing, sorting, despatch or some kind of utilization.

Figure 3:
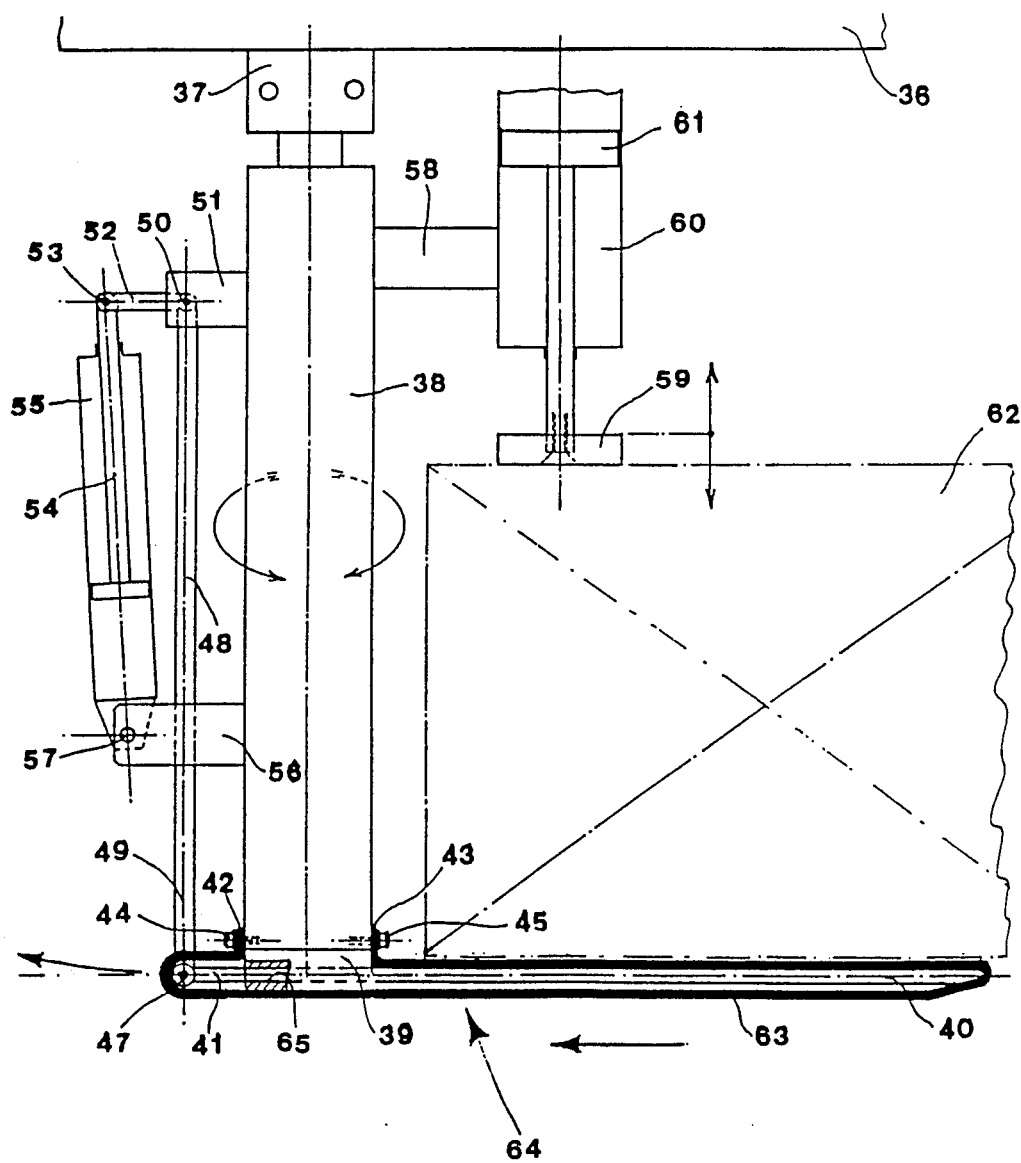
FIG. 3 is a side elevational view of the grab in a different embodiment.

FIG. 3 shows a different kind of grab (64).

The revolving vertical arm (38) is applied by means of support (37) to the trolley (36) which can translate in relation to the arm (13) of the machine.

The support (39) is applied to the lower extremity of said arm and, in relation to said support, the blades (40), fixed to a common back (41) perpendicular to themselves, can translate horizontally through a horizontal slit (65), which passes through this lower extremity.

Lengthwise round the blades a flexible sheath (63) is placed in the form of a ring and is fixed at its two ends (42) and (43) by bolts (44) and (45) at the lower extremity of the arm above the support (39). Sheath (63) is made of cloth, rubber sheeting, plastic and the like, and is ring-shaped.

The common back (41) to the blades is connected by means of pin (47) to the extremity (49) of the L-shaped lever (48) joined in the pin (50) of the bracket (51) fixed to the arm (38).

By means of pin (53), the piston (54) of the hydraulic cylinder (55) is articulated to the other extremity (52) of the lever, and is supported by the bracket (56) fixed to the arm (38) by means of a joint (57).

A third bracket (58) of the arm (38) supports the hydraulic cylinder (60) with piston (61) to the extremity of which is fixed the presser (59) which comes in contact with the package (62).

The packages can therefore be raised by the blades (40) and held by presser (59) during loading on the pallets.

These maneuvres are facilitated by rotation of the grab around the axis of the arm (38).

During unloading it is sufficient to create pressure in the cylinder (55) to cause the extremity (49) of the lever (48) to rotate as shown by the arrows and consequently the blades (40) to translate towards the back side of the grab.

Said translation takes place between the sheath (63) and the package (62) which, after translation, is deposited on the pallet, or bench generally, without any friction by the blades on the package which, even if fragile, is in no way damaged or scratched, something of great importance for some classes of objects.

Figure 4:
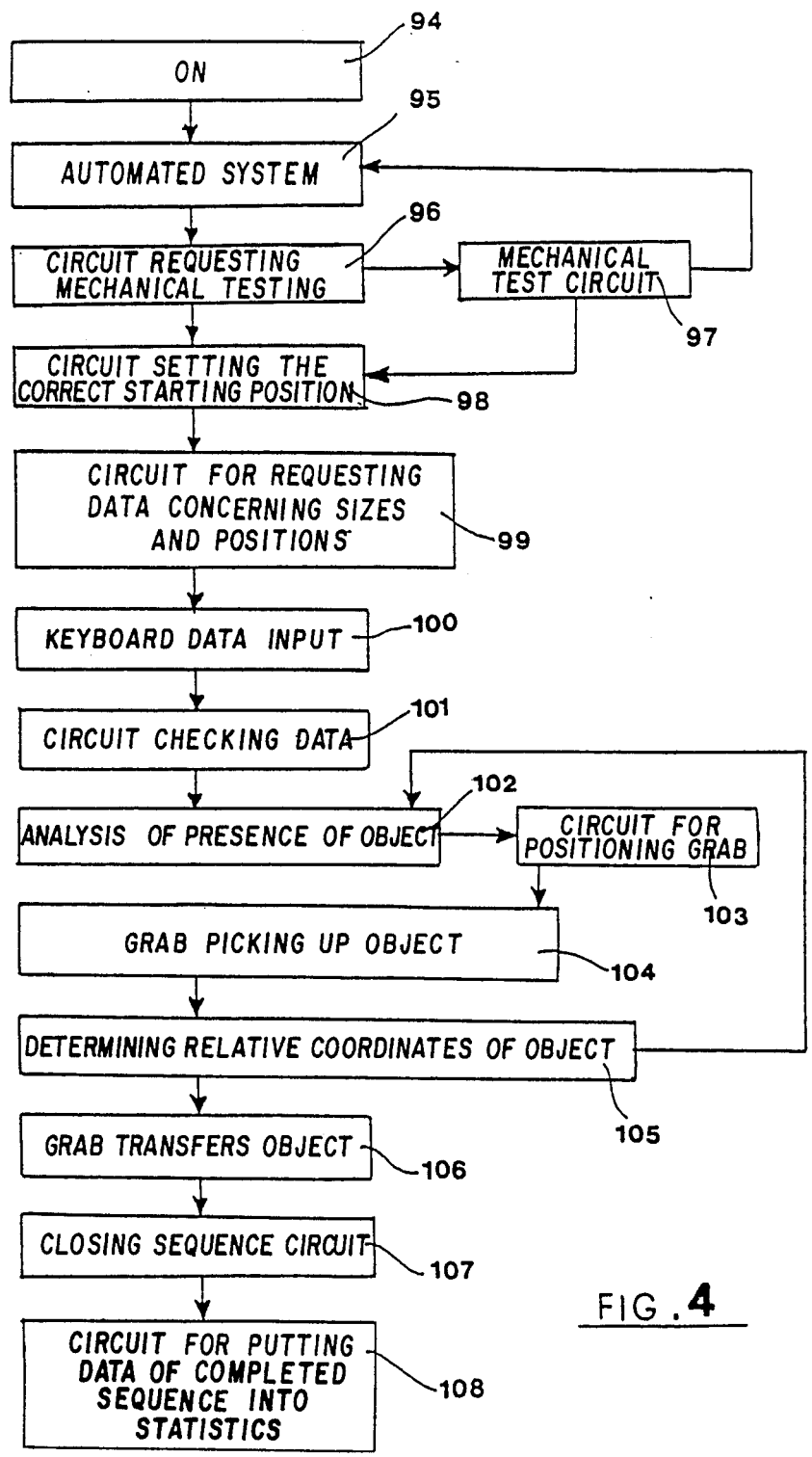
FIG. 4 is a schematic layout of electronic equipment.

FIG. 4 shows a block layout of the main electronic circuits which enable the machine to be controlled by the computer.

When electronic operation is switched on (94), the computer proceeds itself to check that all parts of the automated system (95) are functioning perfectly, requesting by means of circuit (96) mechanical tests carried out by circuit (97), If test results are satisfactory, the computer sets the machine in its correct starting position by means of circuit (98) and then, through circuit (99), requests the data of sizes and positions of the pallet, benches in general, and of the package.

The data (100) put in by the keyboard, and checked by circuit (101) which sets the sequence in motion by analysis (102) of the presence of the package or other object. Having done this the circuit (103) puts the grab in position and causes it to pick up the piece (104).

Having worked out the coordinates of the object in relation to the pallet, or structure of any other kind (105), the grab (106) is operated to transfer the object onto the pallet in the best previously established position and then to release it. By means of circuit (107), the sequence is thus closed. Data on the completed sequence are stored in circuit (109) and put into statistics by circuit (108) for transmission to a central computer.

Advantages

The machine can be operated even by inexperienced staff as only a few pieces of simple data, requested by the computer itself, have to be typed in.

The computer can operate lifting of innumerable kinds of products with the grab described or a similar one.

The non-scratching grab device can be used even for very delicate materials without risk of damaging them.

As soon as the machine has received the data it is ready for work, requiring no further time for mechanical or other adjustments.

Essential data such as sizes and position of packages or objects and of the pallets or other structures, when the machine is started up it begins, almost in real time, to load one package after another onto the pallets or, the contrary, to unload them one by one from the pallets and setting them down quickly and carefully where they are needed.

The same machine can be used for many other purposes such as, for example, feeding pieces into a machine or taking them out from the same machine.

As the applications of the invention have been described as examples only, not limited to these, it is understood that any equivalent application of the inventive concepts explained and any product executed and/or in operation in accordance with the characteristics of the invention will be covered by its field of protection.

We claim:

1. Machine for automatic transfer of objects especially packages of books, from a line or point of arrival or of production to loading pallets and for placing said objects in the best or preferred way on the pallets or else for transferring said objects from the pallets to lines or points of further processing or use, comprising a grab for picking up and setting down the objects especially packages of books, controlled by an electronic control panel directly from a computer to take up any position in space in relation to the objects and the pallets, characterized in that the grab is provided with horizontal blades mounted for axial translation through a horizontal slit passing from one side to the other of a support located at the lower extremity of a vertical arm, the blades moving through the slit from the rear face to the front face of the arm to pick up the object and moving through the slit from the front face to the rear face of the arm to release the object, the blades being enclosed in an annular sheath of flexible material, the ends of which are attached to the front and rear sides respectively of the arm above the slit, such that the blade slide through the slit within the sheath and the sheath lies between the blades and the object, rearward movement of the blades resulting in release of the object onto a receiving surface without friction between the objects, the blades and the sheath.

2. Machine for automatic transfer of objects, especially packages of books, as in claim 1, characterized in that suitable sensors, placed on the trajectories or stationary positions of the objects and loading pallets, provide the computer with all data of sizes and positions, from one moment to the next, of the objects and of the pallets, so that, when needed, it is sufficient to provide the computer with data required for deciding the best or preferred position for the objects in relation to the pallets.

* * * * *